(12) United States Patent
Konegawa et al.

(10) Patent No.: US 10,649,155 B2
(45) Date of Patent: May 12, 2020

(54) CONNECTOR MEMBER FOR OPTICAL WAVEGUIDE, OPTICAL CONNECTOR KIT USING SAME, AND OPTICAL INTERCONNECTION OBTAINED THEREBY

(71) Applicant: NITTO DENKO CORPORATION, Ibaraki-shi, Osaka (JP)

(72) Inventors: Naoto Konegawa, Ibaraki (JP); Yuichi Tsujita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 16/091,184

(22) PCT Filed: Apr. 6, 2017

(86) PCT No.: PCT/JP2017/014360
§ 371 (c)(1),
(2) Date: Oct. 4, 2018

(87) PCT Pub. No.: WO2017/179484
PCT Pub. Date: Oct. 19, 2017

(65) Prior Publication Data
US 2019/0113691 A1 Apr. 18, 2019

(30) Foreign Application Priority Data
Apr. 12, 2016 (JP) .................. 2016-079379

(51) Int. Cl.
G02B 6/38 (2006.01)
G02B 6/10 (2006.01)

(52) U.S. Cl.
CPC ............. G02B 6/3855 (2013.01); G02B 6/10 (2013.01); G02B 6/3826 (2013.01);
(Continued)

(58) Field of Classification Search
CPC .. G02B 6/3855; G02B 6/3826; G02B 6/3847; G02B 6/3853; G02B 6/3885; G02B 6/10; G02B 6/3883
(Continued)

(56) References Cited

U.S. PATENT DOCUMENTS 5,177,808 A * 1/1993 Satake ................. G02B 6/3814
385/70
2006/0024012 A1 2/2006 Yatsuda et al.
(Continued)

FOREIGN PATENT DOCUMENTS

JP 3-148610 A 6/1991
JP 2000-98186 A 4/2000
(Continued)

OTHER PUBLICATIONS

International Search Report dated Jul. 11, 2017, issued in counterpart International Application No. PCT/JP2017/014360 (2 pages).
(Continued)

*Primary Examiner* — Michael P Mooney
(74) *Attorney, Agent, or Firm* — Westerman, Hattori, Daniels & Adrian, LLP

(57) ABSTRACT

A connector member for an optical waveguide includes a housing provided with a space portion for holding an end portion of an optical waveguide. In the housing, protruding portions serving as a positioner are provided on left-hand and right-hand side wall portions defining the space portion. Notches in the optical waveguide are fitted on the protruding portions, whereby a front end surface of the end portion of the optical waveguide is positioned at a location a predetermined distance inward from a front end surface of the housing. This configuration achieves optical coupling with-
(Continued)

out bringing the end surface of the optical waveguide into direct abutment with an end surface of a target optical connector.

10 Claims, 11 Drawing Sheets

(52) U.S. Cl.
CPC ......... *G02B 6/3847* (2013.01); *G02B 6/3853* (2013.01); *G02B 6/3883* (2013.01); *G02B 6/3885* (2013.01)

(58) Field of Classification Search
USPC ...................................................... 385/78–87
See application file for complete search history.

(56) References Cited

U.S. PATENT DOCUMENTS

| | | | |
|---|---|---|---|
| 2008/0095503 | A1 | 4/2008 | Hasegawa et al. |
| 2010/0014815 | A1* | 1/2010 | Ohmura ............... G02B 6/3846 385/83 |
| 2012/0183264 | A1 | 7/2012 | Shimotsu et al. |
| 2015/0234129 | A1 | 8/2015 | Akabane et al. |
| 2017/0038542 | A1 | 2/2017 | Shibuya et al. |

FOREIGN PATENT DOCUMENTS

| | | |
|---|---|---|
| JP | 2005-202228 A | 7/2005 |
| JP | 2006-39282 A | 2/2006 |
| JP | 2010-243946 A | 10/2010 |
| JP | 2011-22198 A | 2/2011 |
| JP | 2012-247732 A | 12/2012 |
| JP | 2015-155969 A | 8/2015 |
| JP | 2016-139065 A | 8/2016 |
| TW | 201535003 A | 9/2015 |
| WO | 2008/044654 A1 | 4/2008 |

OTHER PUBLICATIONS

JPCA Standards, "Detail Specification for PMT Connector" JPCA-PE03-01-07S-2006, Japan Electronics Packaging and Circuits Association, May 2006 (Heisei 18). w/English Abstract. Cited in Specification. (20 pages).

Notification of Transmittal of Translation of the International Preliminary Report on Patentability (Form PCT/IB/338) issued in counterpart International Application No. PCT/JP2017/014360 dated Oct. 25, 2018, with Forms PCT/IB/373 and PCT/ISA/237. (8 pages).

Office Action dated Nov. 4, 2019, issued in counterpart Chinese Patent Application No. 201780022605.2 with English language translation. (12 pages).

Office Action dated Dec. 3, 2019, issued in counterpart Japanese Patent Application No. 2016-079379, with English language translation. (6 pages).

Office Action dated Dec. 12, 2019, issue in counterpart TW Application No. 106111513, with English translation.

* cited by examiner

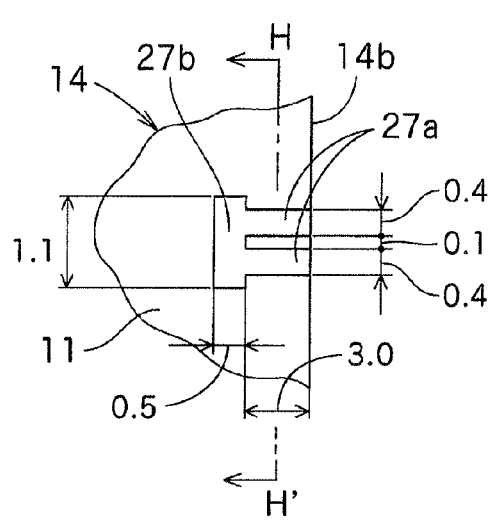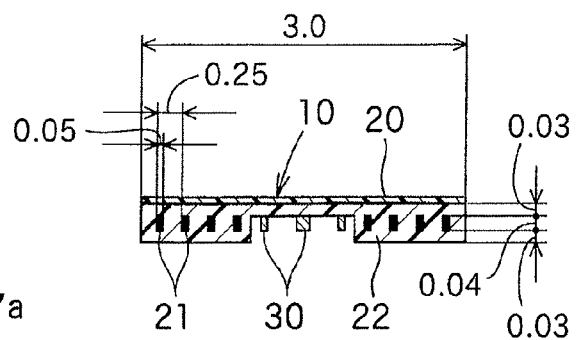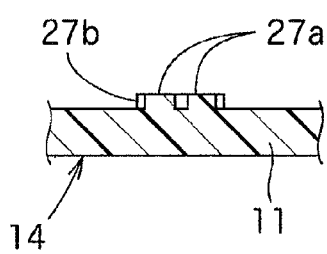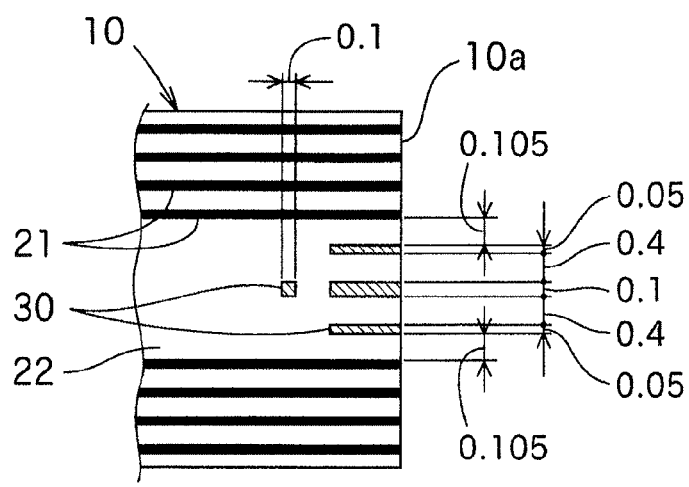

RELATED ART

CONNECTOR MEMBER FOR OPTICAL WAVEGUIDE, OPTICAL CONNECTOR KIT USING SAME, AND OPTICAL INTERCONNECTION OBTAINED THEREBY

TECHNICAL FIELD

The present disclosure relates to a connector member for an optical waveguide which is used for optical connection between an optical waveguide and another light guide, an optical connector kit using the connector member for an optical waveguide, and an optical interconnection obtained thereby.

BACKGROUND ART

In recent years, increases in degree of integration and scale of electronic devices have caused heat generation from and power consumption of electrical interconnections used frequently for connection between boards in the devices and between chips on the boards to become problems. To solve the problems, an optical interconnection technique has been developed which replaces these electrical interconnections with light-weight low-heat-generating flexible optical waveguides and optical fibers.

For such optical interconnections, the standardization of the shapes, dimensions, and testing methods of optical connectors used for coupling between boards and the like under JIS (Japanese Industrial Standards) has been promoted, and the forms of alignment and coupling between optical connectors have been standardized. Thus, the optical connectors have been easily connectable to other optical connectors of different types (see NPL 1, for example).

For example, as shown in FIG. 16, a first optical connector in which a PMT ferrule (a general-purpose ferrule for an optical waveguide) 2 is attached to an end portion (a terminus) of an optical waveguide 1 and a second optical connector in which an MT ferrule (a general-purpose ferrule for an optical fiber) 4 is attached to an end portion of a multi-core optical fiber 3 are easily connected (optically coupled) to each other, with the optical axes of the first and second optical connectors positioned using two guide pins 5 with high accuracy. In the present disclosure, an optical waveguide and an optical fiber are collectively referred to as a "light guide" in some cases.

A known example of the optical connector is obtained by assembling optical connector members configured as shown in FIG. 17 together (see PTL 1). The optical connector members are assembled in a manner to be described below. First, with the optical waveguide 1 inserted through a PMT boot portion 6, an end portion of the optical waveguide 1 having upper and lower surfaces coated with an adhesive agent is fitted in an optical waveguide fitting groove 8 formed in an upper surface of a PMT ferrule body portion 7. Then, positioning is effected so that a front end surface 1a of the optical waveguide 1 is uncovered at (flush with) a front end surface 7a of the PMT ferrule body portion 7. Next, the PMT boot portion 6 is pressed into an opening in a rear end surface 7b of the PMT ferrule body portion 7, and a PMT cover portion 9 is pressed from above. With this condition maintained, the adhesive agent is cured, so that all of the optical connector members are integrated together. If part of the adhesive agent juts as a burr out of the front end surface 7a of the PMT ferrule body portion 7 serving as an optical coupling surface or the front end surface 1a of the optical waveguide 1 is not clean, proper optical coupling is not achieved. In such a case, the front end surface 7a of the PMT ferrule body portion 7 is polished. In this manner, the optical connector is obtained.

Also known is an optical connector in which a lens array is provided on a front end surface of an optical waveguide to provide a light gathering capability without achieving optical coupling by bringing the front end surface of the optical waveguide into direct abutment with a front end surface of an optical fiber or the like (see PTL 2).

RELATED ART DOCUMENTS

Non-Patent Document

NPL 1: JPCA Standards, "Detail Specification for PMT Connector" JPCA-PE03-01-07S-2006, Japan Electronics Packaging and Circuits Association, May 2006 (Heisei 18).

PATENT DOCUMENTS

PTL 1: JP-A-2012-247732
PTL 2: JP-A-2015-155969

SUMMARY OF INVENTION

Unfortunately, the optical connector involving the need for the step of polishing the front end surface of the PMT ferrule body portion as in the aforementioned example has a problem in increasing manufacturing costs. Also, the polishing of the front end surface of the PMT ferrule body portion causes other problems in flaws or scratches in the end surface of the optical waveguide and in residual foreign matter. These problems are prone to result in optical connection losses. In an optical connector for connection to an optical fiber, an optical fiber generally protrudes about several micrometers from a connection end surface thereof. Repeating the connection between such an optical connector and an optical waveguide causes a problem in that the protruding front end of the optical fiber repeatedly abuts against the end surface of the optical waveguide to produce flaws or scratches in the end surface of the optical waveguide, thereby resulting in an increase in optical connection losses.

On the other hand, the optical connector including the lens array has an advantage that the polishing step is not required. However, an optical coupling portion on which light is gathered by the lens array becomes a pinpoint, so that even a slight misalignment between the optical axes thereof causes extreme optical connection losses. This gives rise to a problem in that a high degree of assembling accuracy is required.

There has been proposed another technique in which light exiting a lens array is intentionally widened to form collimated light. However, it is difficult for a target optical connector to receive all of the collimated light, so that a problem arises in which optical connection losses are prone to occur without misalignment between the optical axes. To solve this problem, it is desirable to provide a lens on the front end portion of an optical fiber in the target optical connector, thereby providing a light gathering capability to the target optical connector, for example. This technique, however, limits the target optical connector for connection to have poor versatility. In addition, the use of a combination of two lens-equipped optical connectors creates another problem in increasing costs.

In view of the foregoing, it is therefore an object of the present disclosure to provide an excellent connector member for an optical waveguide capable of providing optical coupling without bringing an end surface of the optical waveguide into direct abutment with an end surface of a target optical connector for connection thereto, an optical connector kit using the connector member for an optical waveguide, and an optical interconnection obtained thereby.

A first aspect of the present disclosure is intended for a connector member for an optical waveguide, which comprises a housing having a base end surface provided with an opening for insertion of an optical waveguide, a front end surface provided with an opening for optical coupling between the optical waveguide and another light guide, a space portion extending from the opening of the base end surface to the opening of the front end surface, and a wall portion surrounding the space portion, wherein the space portion is configured to hold an end portion of the optical waveguide, and the wall portion is provided with a positioner configured to position a front end surface of the end portion of the optical waveguide held in the space portion at a location a distance inward from the front end surface of the housing.

In particular, a second aspect of the present disclosure is intended for the connector member for an optical waveguide, wherein the distance that the front end surface of the end portion of the optical waveguide held in the space portion of the housing is spaced inward from the front end surface of the housing is in the range of 5 to 50 µm.

In particular, a third aspect of the present disclosure is intended for the connector member for an optical waveguide, wherein a protruding portion protruding inward into the space portion is provided as the positioner on the wall portion near the front end surface of the housing. In particular, a fourth aspect of the present disclosure is intended for the connector member for an optical waveguide, wherein a tapered surface making the space portion narrower toward the front end surface is provided as the positioner in a predetermined region of the wall portion of the housing which extends in a direction from the base end surface toward the front end surface.

A fifth aspect of the present disclosure is intended for an optical connector kit comprising: an optical waveguide; and a connector member for an optical waveguide, wherein the connector member for an optical waveguide includes a housing having a base end surface provided with an opening for insertion of the optical waveguide, a front end surface provided with an opening for optical coupling between the optical waveguide and another light guide, a space portion extending from the opening of the base end surface to the opening of the front end surface, and a wall portion surrounding the space portion, and the space portion configured to hold an end portion of the optical waveguide, and wherein at least one of the wall portion of the housing and the end portion of the optical waveguide held in the space portion is provided with a positioner configured to position a front end surface of the end portion of the optical waveguide held in the space portion at a location a distance inward from the front end surface of the housing.

In particular, a sixth aspect of the present disclosure is intended for the optical connector kit, wherein the distance that the front end surface of the end portion of the optical waveguide held in the space portion of the housing is spaced inward from the front end surface of the housing is in the range of 5 to 50 µm.

In particular, a seventh aspect of the present disclosure is intended for the optical connector kit, wherein protruding or recessed shapes to be fitted together as the positioner are imparted respectively to the wall portion of the housing and to the end portion of the optical waveguide held in the space portion.

An eighth aspect of the present disclosure is intended for an optical interconnection comprising: an optical waveguide; and a connector member for an optical waveguide, wherein the connector member for an optical waveguide includes a housing having a base end surface provided with an opening for insertion of the optical waveguide, a front end surface provided with an opening for optical coupling between the optical waveguide and another light guide, a space portion extending from the opening of the base end surface to the opening of the front end surface, and a wall portion surrounding the space portion, and an end portion of the optical waveguide is held in the space portion, and wherein a positioner provided in at least one of the wall portion of the housing and the end portion of the optical waveguide positions a front end surface of the end portion of the optical waveguide held in the space portion at a location a distance inward from the front end surface of the housing.

In particular, a ninth aspect of the present disclosure is intended for the optical interconnection, wherein the distance that the front end surface of the end portion of the optical waveguide held in the space portion of the housing is spaced inward from the front end surface of the housing is in the range of 5 to 50 µm. In particular, a tenth aspect of the present disclosure is intended for the optical interconnection, wherein protruding or recessed shapes to be fitted together as the positioner are imparted respectively to the wall portion of the housing and to the end portion of the optical waveguide held in the space portion.

The term "opening" as used in the present disclosure is not limited to an opening having a shape such that opening edges are closed in the form of a frame but is to be interpreted as including an opening having a notched shape such that opening edges are partially open.

That is, the connector member for an optical waveguide according to the present disclosure is provided for optically coupling an optical waveguide and another light guide together, and comprises the housing having the base end surface provided with the opening for insertion of the optical waveguide, the front end surface provided with the opening for optical coupling between the optical waveguide and another light guide, the space portion extending from the opening of the base end surface to the opening of the front end surface, and the wall portion surrounding the space portion. The space portion is configured to hold the end portion of the optical waveguide. The wall portion surrounding the space portion is provided with the positioner configured to position the front end surface of the end portion of the optical waveguide held in the space portion at the location the distance inward from the front end surface of the housing.

In this configuration, the optical waveguide is held while the front end surface of the end portion of the optical waveguide is positioned at the location the distance inward from the front end surface for optical coupling of the connector member for an optical waveguide. This prevents damage to the front end surface of the optical waveguide even if connection to an optical connector having a slightly protruding optical fiber is repeated. Also, the end surface for optical coupling of the optical waveguide is disposed inward from the front end surface of the housing. This allows the end surface of the optical waveguide to be kept clean independent of damage to the front end surface of the housing itself and smearing resulting from an adhesive agent. This eliminates the need to polish the front end surface of the housing where the end surface of the optical waveguide is uncovered and the need to provide a lens array, unlike conventional optical connectors. Thus, the excellent optical connector less expensive and low in optical connection losses is provided.

In particular, the connector member for an optical waveguide wherein the distance that the front end surface of the end portion of the optical waveguide held in the space portion of the housing is spaced inward from the front end surface of the housing is in the range of 5 to 50 μm is preferable because the distance between the end surface of the target for connection thereto and the front end surface of the end portion of the optical waveguide held by this connector member is short enough to substantially neglect the influence upon optical connection losses.

In particular, the connector member for an optical waveguide wherein the protruding portion protruding inward into the space portion is provided as the positioner on the wall portion near the front end surface of the housing or wherein the tapered surface making the space portion narrower toward the front end surface is provided as the positioner in the predetermined region of the wall portion of the housing which extends in the direction from the base end surface toward the front end surface is preferable because the front end surface of the end portion of the optical waveguide is positioned easily with high accuracy in the space portion of the housing.

The optical connector kit according to the present disclosure includes the optical waveguide and the connector member for an optical waveguide. The positioner provided in at least one of the wall portion of the housing of the connector member and the end portion of the optical waveguide positions the front end surface of the end portion of the optical waveguide at the location the distance inward from the front end surface of the housing of the connector member. This prevents damage to the front end surface of the optical waveguide even if connection to an optical connector having a slightly protruding optical fiber is repeated, as mentioned above. Also, the end surface for optical coupling of the optical waveguide is disposed inward from the front end surface of the housing. This allows the end surface of the optical waveguide to be kept clean independently of damages to the front end surface of the housing itself and smearing resulting from an adhesive agent. This eliminates the need to polish the front end surface of the housing where the end surface of the optical waveguide is uncovered and the need to provide a lens array, unlike conventional optical connectors. Thus, the excellent optical connector less expensive and low in optical connection losses is provided.

In particular, the optical connector kit according to the present disclosure wherein the distance that the front end surface of the end portion of the optical waveguide held in the space portion of the housing is spaced inward from the front end surface of the housing is in the range of 5 to 50 μm is preferable because the distance between the end surface of the target for connection thereto and the front end surface of the end portion of the optical waveguide held by this connector member is short enough to substantially neglect the influence upon optical connection losses.

In particular, the optical connector kit according to the present disclosure wherein the protruding or recessed shapes to be fitted together as the positioner are imparted respectively to the wall portion of the housing and to the end portion of the optical waveguide held in the space portion is preferable because the positioner on the optical waveguide side is formed with high positional accuracy at the same time that the cladding layer or the cores are patterned during the formation of the optical waveguide.

The optical interconnection according to the present disclosure is capable of providing a high-quality optical connection structure that is low in costs and low in optical connection losses. In the aforementioned optical connection structure, the front end surface of the end portion of the optical waveguide is not damaged even if connection to and disconnection from an optical connector in which another light guide is held is repeated. This is advantageous in that the optical connection losses are less prone to increase and in that satisfactory long-term use is achieved.

In particular, the optical interconnection according to the present disclosure wherein the distance that the front end surface of the end portion of the optical waveguide held in the space portion of the housing is spaced inward from the front end surface of the housing is in the range of 5 to 50 μm is preferable because the distance between the end surface of the target for connection thereto and the front end surface of the end portion of the optical waveguide held by this connector member is short enough to substantially neglect the influence upon optical connection losses.

In particular, the optical interconnection according to the present disclosure wherein the protruding or recessed shapes to be fitted together as the positioner are imparted respectively to the wall portion of the housing and to the end portion of the optical waveguide held in the space portion is preferable because this optical interconnection provides particularly high positioning accuracy for the front end surface of the end portion of the optical waveguide to achieve an optical connection structure with higher reliability.

BRIEF DESCRIPTION OF DRAWINGS

FIG. 14A is an illustration of the housing in a connector member for an optical waveguide for use in another inventive example of the present disclosure; FIG. 14B is a sectional view taken along the line H-H' of FIG. 14A; FIG. 14C is an illustration of the optical waveguide held by the connector member for an optical waveguide; and FIG. 14D is an illustration of a core pattern in the optical waveguide.

DESCRIPTION OF EMBODIMENTS

Next, embodiments according to the present disclosure will now be described in detail with reference to the drawings. It should be noted that the present disclosure is not limited to the embodiments to be described below. Components are shown schematically in the following figures. The thickness, size and the like of the components shown in the figures are different from the actual ones.

Figure 1:
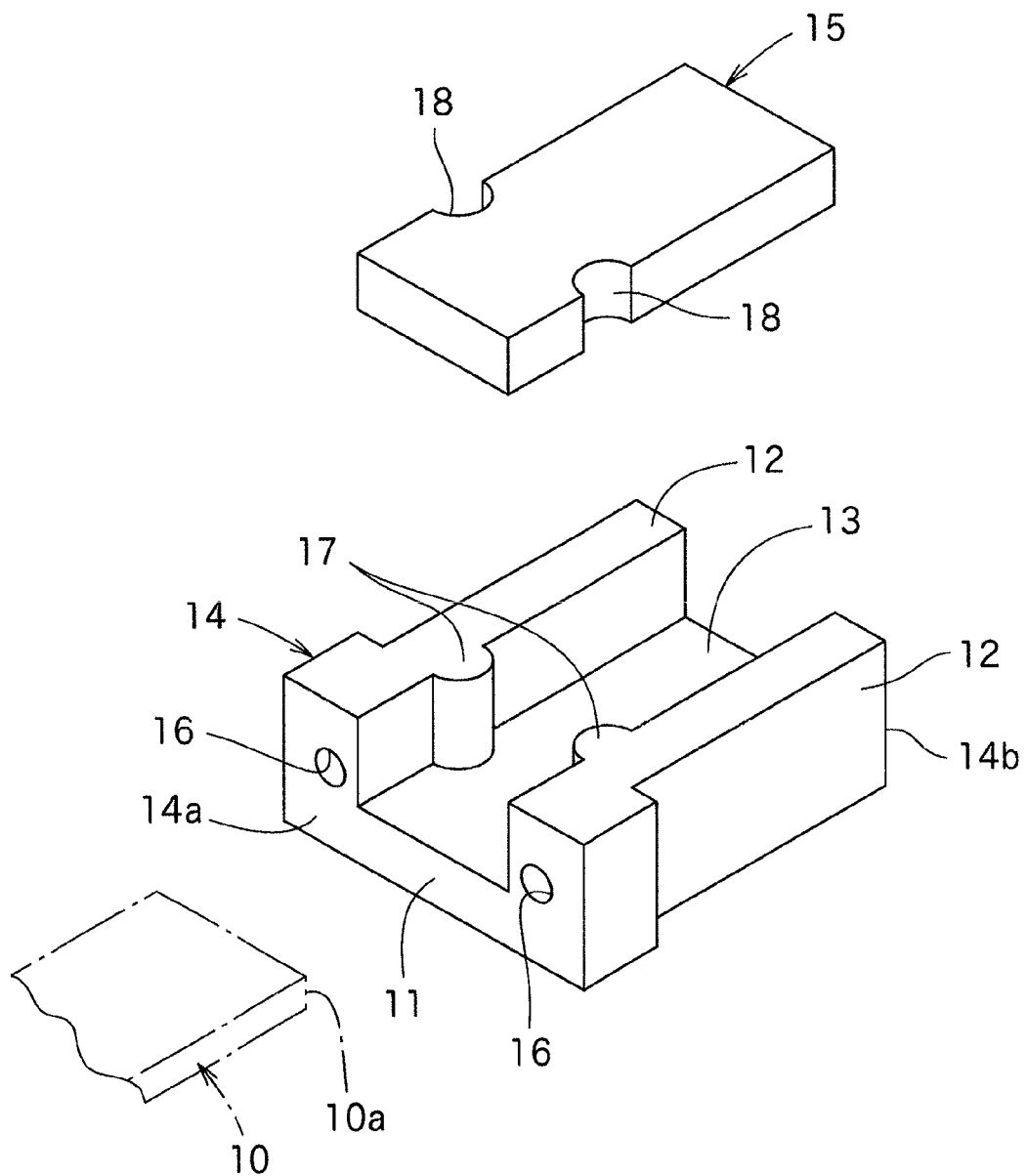
FIG. 1 is a partial perspective view showing one embodiment of an optical connector kit according to the present disclosure.

FIG. 1 shows a connector member for an optical waveguide (abbreviated as a "connector member" hereinafter) for use in one embodiment of an optical connector kit according to the present disclosure. The connector member includes: a housing 14 capable of holding an end portion of an optical waveguide 10 in a groove-like space portion 13 surrounded by a bottom wall portion 11 and left-hand and right-hand side wall portions 12; and a cover 15 for blocking an upper surface opening of the space portion 13 to fix the end portion of the optical waveguide 10. The cover 15 can be said to be part of the wall portions surrounding the space portion 13 in conjunction with the left-hand and right-hand side wall portions 12 and the bottom wall portion 11 of the housing 14. The housing 14 includes a base end surface 14a on the side where the end portion of the optical waveguide 10 is inserted, and a front end surface 14b on the side for abutment with a different optical connector and used for optical coupling. The reference numeral 16 designates guide pin holes for insertion of guide pins used for connection to the different optical connector therethrough. The guide pin holes 16 extend from the base end surface 14a to the front end surface 14b.

The left-hand and right-hand side wall portions 12 of the housing 14 have respective protruding portions 17 formed in confronting portions of the inside surfaces on the base end surface 14a side and each protruding in a semicircular shape as seen in plan view toward the space portion 13. The cover 15 has notches 18 semicircular in shape as seen in plan view and corresponding to the protruding portions 17.

Figure 2A:
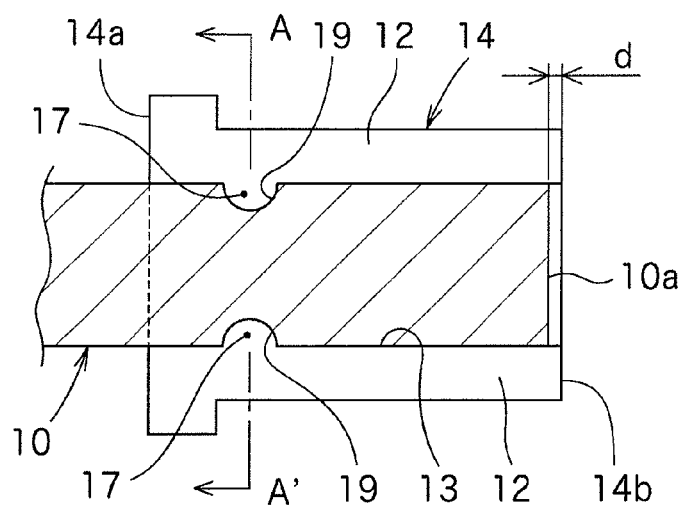
FIG. 2A is a plan view showing that an end portion of an optical waveguide is held by a housing in the aforementioned embodiment.

As shown in FIG. 2A, the optical waveguide 10 to be combined with the connector member has an end portion to be held in the housing 14, and this end portion has notches 19 semicircular in shape as seen in plan view and formed in portions corresponding to the protruding portions 17 of the housing 14. The end portion of the optical waveguide 10 is placed in the space portion 13, with the notches 19 fitted on the protruding portions 17 on the housing 14 side, whereby a front end surface 10a of the end portion of the optical waveguide 10 is positioned at a location a distance d inward from the front end surface 14b of the housing 14. The outermost shape of the notches 19 of the optical waveguide 10 is formed by cores 21 or a cladding layer 22 (with reference to FIG. 2B). The use of the cores 21 for the formation of the outermost shape is preferable because the notches 19 are fitted on the protruding portions 17 on the housing 14 side with higher positional accuracy.

Figure 2B:
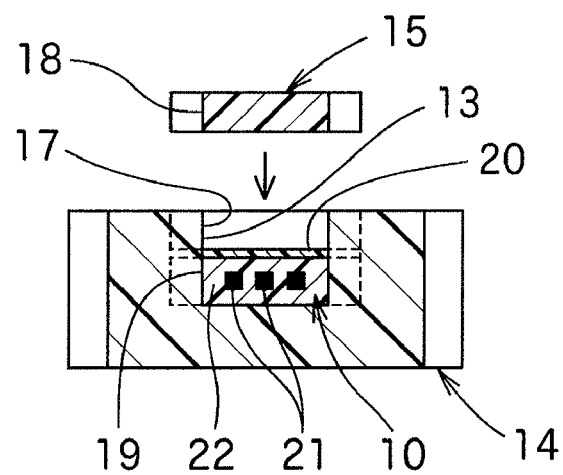
FIG. 2B is a sectional view taken along the line A-A' of FIG. 2A.

In this optical connector kit, as shown in FIG. 2B, the end portion of the optical waveguide 10 is placed in the space portion 13 while the notches 19 of the optical waveguide 10 are fitted on the protruding portions 17 of the housing 14 of the aforementioned connector member, and the cover 15 is pushed in from above and fixed. This easily provides an optical connector in which the front end surface 10a of the end portion of the optical waveguide 10 is at the location the distance d inward from the front end surface 14b of the housing 14.

In the optical connector obtained by the optical connector kit, the front end surface 10a of the end portion of the optical waveguide 10 attached to the housing 14 of the connector member is positioned at the location the distance d inward from the front end surface 14b of the housing 14. Thus, the front end surface 10a of the end portion of the optical waveguide 10 is prevented from being damaged even if connection to an optical connector having a slightly protruding optical fiber or to an optical connector having an uneven front end surface or the like is repeated. Also, the front end surface 10a of the end portion for optical coupling of the optical waveguide 10 is disposed inward from the front end surface 14b of the housing 14. This allows the front end surface 10a of the end portion to be kept clean independently of damages to the front end surface 14b of the housing 14 itself and smearing resulting from an adhesive agent. This eliminates the need to polish the front end surface 14b of the housing 14 where the front end surface 10a of the end portion of the optical waveguide 10 is uncovered in the opening and to provide a lens array, unlike conventional optical connectors. Thus, the excellent optical connector less expensive and low in optical connection losses is provided.

An optical interconnection including a connection structure using the optical connector is capable of providing a high-quality optical connection structure that is low in costs and low in optical connection losses. In the aforementioned optical connection structure, the front end surface 10a of the end portion of the optical waveguide 10 is not damaged even if connection to and disconnection from an optical connector in which another light guide is held is repeated. This is advantageous in that the optical connection losses are less prone to increase and in that satisfactory long-term use is achieved.

The housing 14 and the cover 15 used for the optical connector kit may be formed by transfer molding, molding, injection molding, or the like with the use of a resin impermeable to light or a dark-colored or black resin, for example, which is made impermeable to light by adding coloring matter such as a pigment or an extender such as titanium to a resin permeable to light.

The optical waveguide 10 used for the aforementioned optical connector kit is not particularly limited. A preferable example of the optical waveguide 10 used herein is an optical waveguide including an insulation layer 20 for electric circuitry, the plurality of cores 21, and the cladding layer 22 (including an under cladding layer and an over cladding layer) provided over and under the cores 21 so as to hold the cores 21 between portions thereof, as shown in FIG. 2B. The material of the insulation layer 20 is not particularly limited. For example, an organic layer such as polyimide, an inorganic layer such as silicon, a metal layer such as insulative stainless steel, or the like may be used, as appropriate, as the material of the insulation layer 20.

The optical waveguide 10 with the insulation layer 20 is obtained by a method of sequentially patterning and stacking the cladding layer 22 and the cores 21 on one surface of the insulation layer 20 by a photolithographic process or the like using an exposure mask, for example, with the use of ultraviolet curable resins such as epoxy resins. The optical waveguide 10 is designed to include the cores 21 having a refractive index (optical refraction index) higher than that of the cladding layer 22 so that an optical signal entering the cores 21 is transmitted only through the cores 21.

The optical connector kit is provided with connector member accessories including guide pins for insertion into the guide pin holes 16 (with reference to FIG. 1) and a boot portion for combination with the housing 14. These components are similar to the conventional components, and will not be shown and described. A certain connector member includes a boot portion formed integrally with the housing 14 on the base end surface 14a side of the housing 14. In such a case, there is no need to combine the boot portion as a separate member with the connector member.

Figure 3:
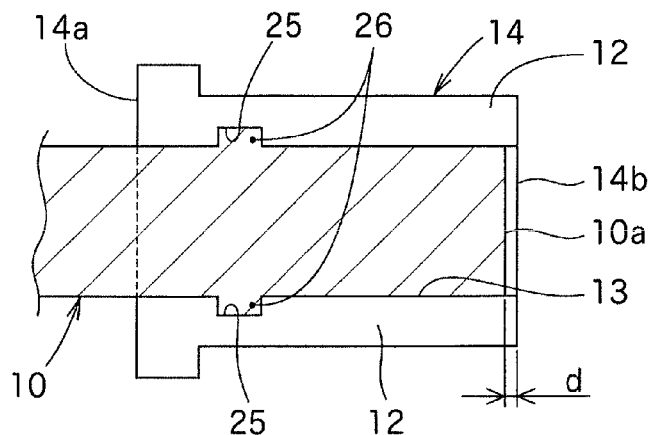
FIG. 3 is a plan view showing a modification of the aforementioned embodiment.

In the aforementioned example, the protruding portions 17 protruding inward from the side wall portions 12 of the housing 14 are provided, and the notches 19 to be fitted on the protruding portions 17 are provided in the end portion of the optical waveguide 10 to be placed in the space portion 13 of the housing 14. The structure for fitting both components together to achieve positioning is not limited to this. For example, as shown in FIG. 3, confronting recessed portions 25 may be formed in the side wall portions 12 of the housing 14 whereas protruding portions 26 to be fitted in the recessed portions 25 are provided on opposite side edges of the end portion of the optical waveguide 10. By fitting the recessed portions 25 and the protruding portions 26 together, the front end surface 10a of the end portion of the optical waveguide 10 is disposed at the location the distance d inward from the front end surface 14b of the housing 14, as in the aforementioned example. This produces effects similar to those of the aforementioned example.

Alternatively, the optical connector kit according to the present disclosure may be configured such that the bottom wall portion 11 of the housing 14 is provided with at least one recess or protrusion and a lower surface of the optical waveguide 10 is provided with at least one protrusion or recess corresponding to the aforementioned at least one recess or protrusion. The positioning of the front end surface 10a of the end portion of the optical waveguide 10 may be achieved by fitting the at least one recess or protrusion and the at least one protrusion or recess together, rather than fitting the side wall portions 12 of the housing 14 of the connector member and the side edge portions of the optical waveguide 10 together.

Figure 4A:
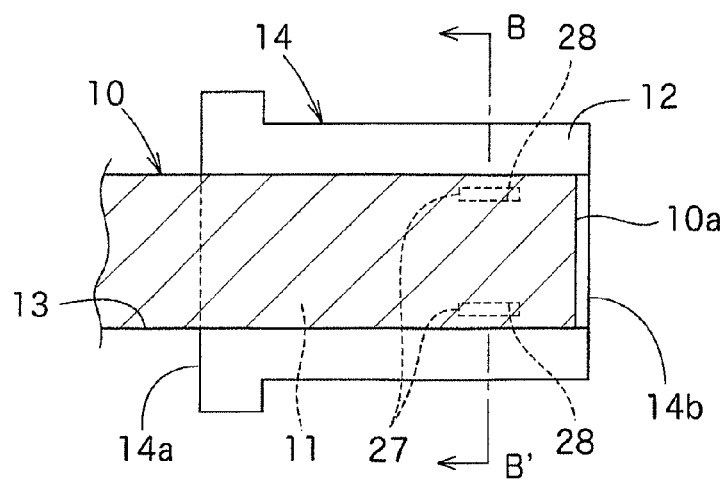
FIG. 4A is a plan view showing that the end portion of the optical waveguide is held by the housing in another embodiment of the optical connector kit according to the present disclosure.
Figure 4B:
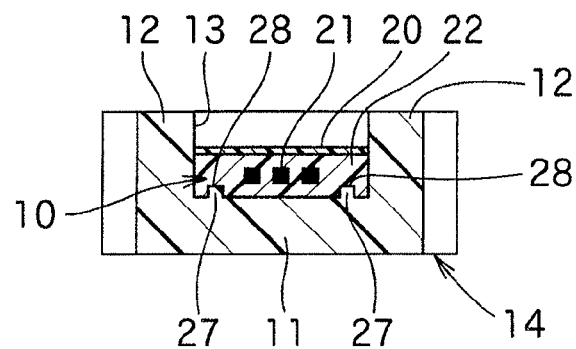
FIG. 4B is a sectional view taken along the line B-B' of FIG. 4A.

For example, as shown in FIG. 4A and FIG. 4B that is a sectional view taken along the line B-B' of FIG. 4A, two parallel elongated protruding portions 27 extending in a longitudinal direction of the optical waveguide 10 are provided on the bottom wall portion 11 of the housing 14, and recessed portions 28 to be fitted on the protruding portions 27 are provided in the lower surface of the optical waveguide 10 in corresponding relation to the protruding portions 27. This easily achieves the positioning of the optical waveguide 10.

The recessed portions 28 are provided with high dimensional accuracy by patterning the recessed portions 28 in the step of forming the cladding layer (over cladding layer) 22 for covering the cores 21 after the step of forming the cores 21 during the manufacture of the optical waveguide 10.

Figure 5:
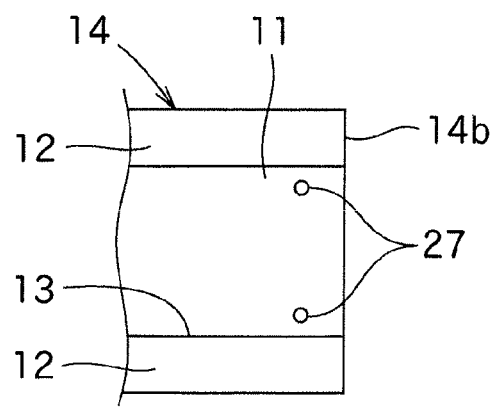
FIG. 5 is a partial plan view showing a modification of the embodiment of FIGS. 4A and 4B.

The shape of the protruding portions 27 provided on the bottom wall portion 11 of the housing 14 is not limited to that of the aforementioned example. For example, as shown in FIG. 5, the protruding portions 27 may be in the shape of a circular pin as seen in plan view or in other shapes. The recessed portions 28 shaped to be fitted on the protruding portions 27 are provided in the lower surface of the optical waveguide 10. This easily achieves the positioning of the front end surface 10a of the end portion of the optical waveguide 10.

Figure 6A:
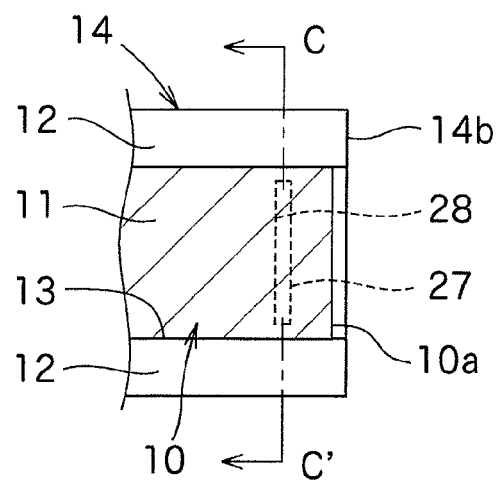
FIG. 6A is a partial plan view showing that the end portion of the optical waveguide is held by the housing in still another embodiment of the optical connector kit according to the present disclosure.
Figure 6B:
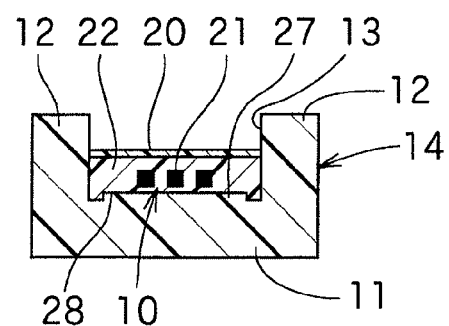
FIG. 6B is a sectional view taken along the line C-C' of FIG. 6A.

Further, a protruding portion 27 extending in a width direction, rather than a longitudinal direction, of the optical waveguide 10 may be provided on the bottom wall portion 11 of the housing 14. Such an example is shown in FIG. 6A and FIG. 6B that is a sectional view taken along the line C-C' of FIG. 6A. In this example, the protruding portion 27 is capable of rigidly fixing the front end surface 10a of the end portion of the optical waveguide 10 in a location near the front end surface 10a. This provides more excellent stability.

Figure 7A:
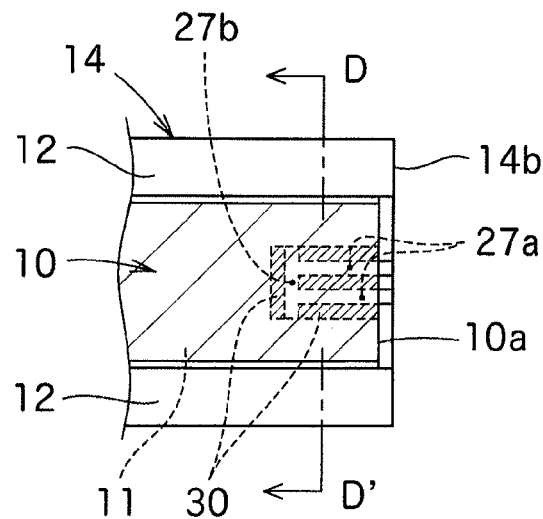
FIG. 7A is a partial plan view showing that the end portion of the optical waveguide is held by the housing in another embodiment of the optical connector kit according to the present disclosure.
Figure 7B:
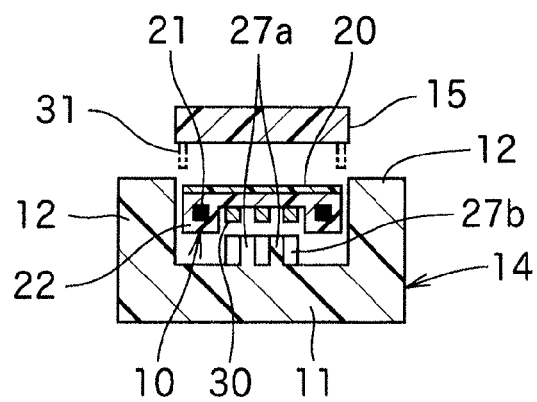
FIG. 7B is a sectional view taken along the line D-D' of FIG. 7A.

As shown in FIG. 7A and FIG. 7B that is a sectional view taken along the line D-D' of FIG. 7A, the protruding portions 27 provided on the bottom wall portion 11 of the housing 14 may include a combination of protruding portions 27a shaped to extend in a longitudinal direction of the optical waveguide 10 and a protruding portion 27b shaped to extend in a width direction of the optical waveguide 10. In that case, recessed portions complementary in shape to the protruding portions 27a and 27b may be formed in the cladding layer 22 serving as the lower surface of the optical waveguide 10. Instead, as shown, dummy cores 30 to be inserted into gaps between the protruding portions 27a and 27b may be formed at the same time as the cores 21 used for light propagation and be kept uncovered to serve as a fitting portion for positioning. This configuration provides higher positioning accuracy of the front end surface 10a of the end portion of the optical waveguide 10 because the dummy cores 30 are formed together with the cores 21 with high dimensional accuracy.

For a smooth fit between the protruding portions 27a and 27b and the dummy cores 30, flexibility is provided by gaps between the optical waveguide 10 and the left-hand and right-hand side wall portions 12 of the housing 14. However, as shown, the optical waveguide 10 is fixed in a stable form by pushing the cover 15 in from above. For the purpose of fixing the optical waveguide 10 in a further stable form, positioning guides 31 (indicated by dash-and-dot lines) protruding downwardly may be provided on left-hand and right-hand sides of the lower surface of the cover 15 and may be fitted between the optical waveguide 10 and the side wall portions 12 of the housing 14. Thus, the positioning in the width direction is achieved with higher accuracy.

Figure 8A:
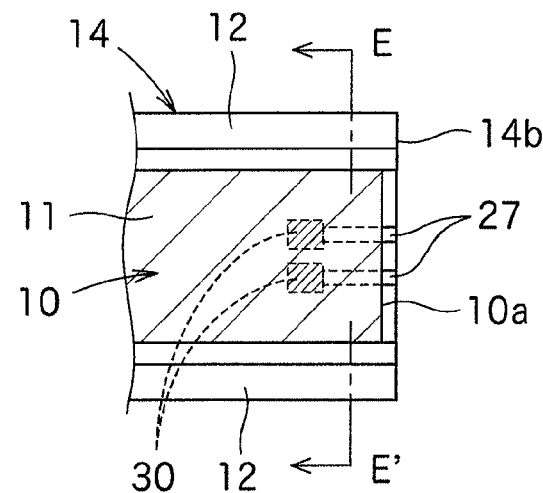
FIG. 8A is a plan view showing that the end portion of the optical waveguide is held by the housing in still another embodiment of the optical connector kit according to the present disclosure.
Figure 8B:
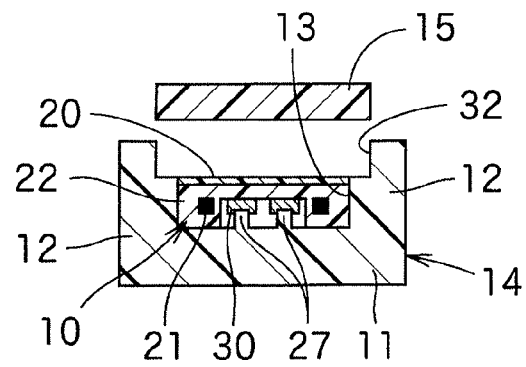
FIG. 8B is a sectional view taken along the line E-E' of FIG. 8A.

For the positioning of the front end surface 10a of the end portion of the optical waveguide 10 by means of the protruding portions 27 provided on the bottom wall portion 11 of the housing 14 and the dummy cores 30 provided on the optical waveguide 10 side, a configuration as shown in FIG. 8A and FIG. 8B that is a sectional view taken along the line E-E' of FIG. 8A may be employed, for example. In this example, the two protruding portions 27 extending in a longitudinal direction of the optical waveguide 10 are provided near the front end surface 14b of the housing 14. Further, two dummy cores 30 are provided in a predetermined location on the optical waveguide 10 side, and protrude downwardly without being covered with the cladding layer 22. Thus, when the end portion of the optical waveguide 10 is inserted from the base end surface 14a side (on the left-hand side as seen in the figure; with reference to FIG. 1) of the housing 14 into the space portion 13 of the housing 14 along the bottom wall portion 11, the dummy cores 30 come into abutment with end surfaces of the protruding portions 27, and are inhibited from further movement toward the front end side. This easily achieves the positioning of the front end surface 10a of the end portion of the optical waveguide 10 at a location inward from the front end surface 14b of the housing 14.

In this example, the optical waveguide 10 is positioned only in the longitudinal direction by abutment with the protruding portions 27. The positioning of the optical waveguide 10 in the width direction is achieved by inside surfaces of the left-hand and right-hand side wall portions 12 of the housing 14. If the cover 15 is pushed in hard from over the optical waveguide 10, there is apprehension that the optical waveguide 10 will be deformed to adversely affect light propagation properties, because the dummy cores 30 of the optical waveguide 10 protrude downwardly. To prevent this, the width of the cover 15 is made greater than that of the optical waveguide 10, and stepped portions 32 for locking the cover 15 having the greater width are provided in the left-hand and right-hand side wall portions 12 of the housing 14. This prevents the cover 15 from being pushed into the thickness of the optical waveguide 10.

In the aforementioned examples, the at least one protruding portion 27 or the like provided on the housing 14 side of the connector member and the at least one recessed portion 28 or the like provided in the optical waveguide 10 itself are fitted together, whereby the positioning of the front end surface 10a of the end portion of the optical waveguide 10 is achieved at a location inward from the front end surface 14b of the housing 14. Alternatively, the cover 15 and the optical waveguide 10 fitted together by providing at least one protruding or recessed portion on or in the lower surface of the cover 15 and providing at least one recessed or protruding portion to be fitted on the aforementioned protruding or recessed portion in or on the upper surface of the optical waveguide 10 (in the aforementioned examples, the upper surface of the insulation layer 20) may be inserted or placed in the space portion 13 of the housing 14 (not shown).

Further, a positioner may be provided only on the housing 14 side whereas no special processing or the like is performed on the optical waveguide 10. This also achieves the positioning of the end portion of the optical waveguide 10 at a location inward from the front end surface 14b of the housing 14.

Figure 9A:
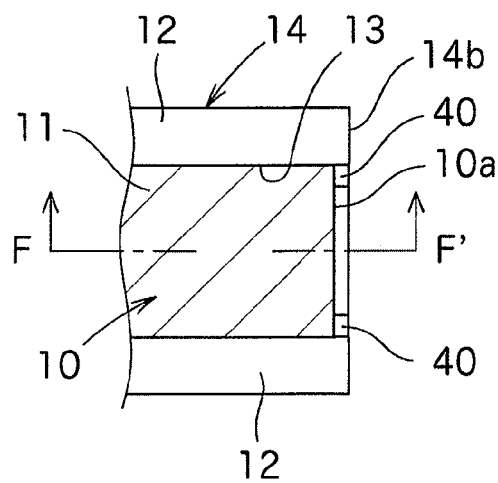
FIG. 9A is a partial plan view showing that the end portion of the optical waveguide is held by the housing in another embodiment of the optical connector kit according to the present disclosure.
Figure 9B:
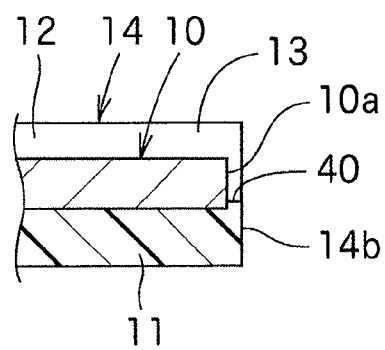
FIG. 9B is a sectional view taken along the line F-F' of FIG. 9A.

For example, as shown in FIG. 9A and FIG. 9B that is a sectional view taken along the line F-F' of FIG. 9A, stoppers 40 having a thickness equal to the distance d (with reference to FIG. 2A) that the front end surface 10a of the end portion of the optical waveguide 10 is desired to be spaced inward are provided on opposite sides of the end edge portion of the bottom wall portion 11 of the housing 14 on the front end surface 14b side. This inhibits the optical waveguide 10 (only the outline of which is shown; the same applies to the subsequent figures) from further moving toward the front end surface 14b of the housing 14 to achieve the positioning of the optical waveguide 10. In this case, the optical waveguide 10 is also fixed by pushing the cover 15 (not shown) in downwardly from over the positioned optical waveguide 10.

Figure 10A:
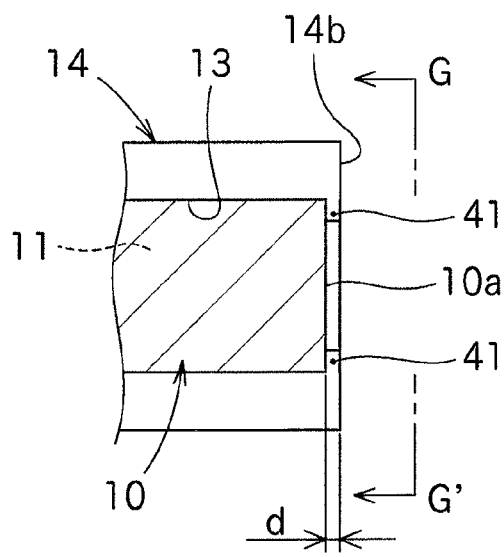
FIG. 10A is a partial plan view of a modification of the housing.
Figure 10B:
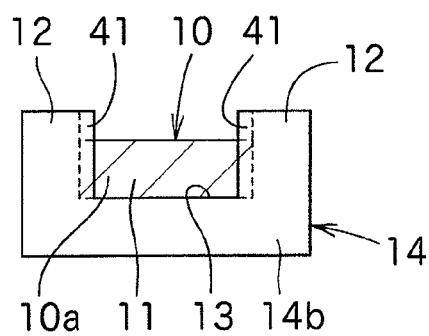
FIG. 10B is a view as seen in the direction of the arrows G-G' of FIG. 10A.

The stoppers 40 may be in any shape unless the stoppers 40 hinder the optical coupling between the optical waveguide 10 and another light guide in the front end surface 14b of the housing 14. For example, as shown in FIG. 10A and FIG. 10B that is a view as seen in the direction of the arrows G-G' of FIG. 10A, stoppers 41 equal in height to the left-hand and right-hand side wall portions 12 of the housing 14 may be provided.

Figure 11:
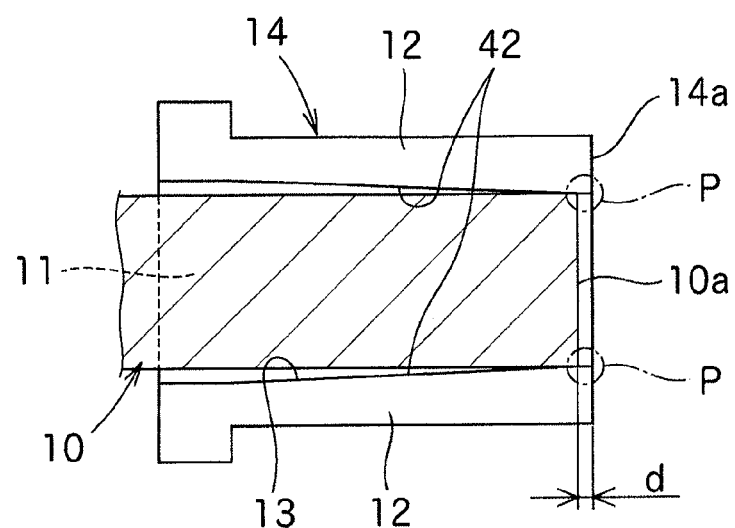
FIG. 11 is a plan view showing that the end portion of the optical waveguide is held by the housing in still another embodiment of the optical connector kit according to the present disclosure.

In place of the stoppers 40 and 41, the inside surfaces of the left-hand and right-hand side wall portions 12 of the housing 14 may be formed as tapered surfaces 42 approaching each other toward the front end surface 14b, as shown in FIG. 11, for example. This inhibits the front end surface 10a of the end portion of the optical waveguide 10 from further moving toward the front end side beyond the location of the distance d disposed inward of the front end surface 14b of the housing 14 to achieve the positioning of the front end surface 10a of the end portion of the optical waveguide 10.

When the tapered surfaces 42 are provided in the left-hand and right-hand side wall portions 12 of the housing 14 in the aforementioned manner, the aforementioned stoppers 40 or 41 may be provided in portions surrounded by circles P shown in FIG. 11 so as to achieve the positioning with higher reliability.

Alternatively, stoppers or tapered surfaces (not shown) for inhibiting the front end surface 10a of the end portion of the optical waveguide 10 from further moving toward the front end surface 14b side of the housing 14 may be provided on the lower surface of the cover 15, rather than the stoppers 40 or 41 and the tapered surfaces 42 provided on the housing 14 side as in the aforementioned examples. In that case, it is desirable that the cover 15 is fixed on the upper surface of the housing 14 before the optical waveguide 10 is inserted in the housing 14.

Figure 12A:
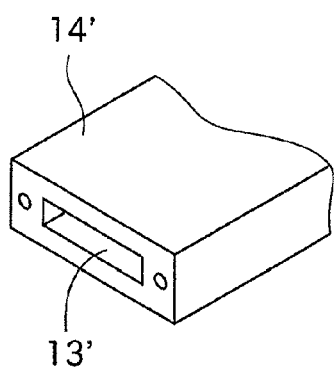
FIG. 12A is a partial perspective view of the housing in another embodiment of the optical connector kit according to the present disclosure.

The connector member of another type is originally in an entirely tubular shape with a space portion 13' in the shape of a through hole, as schematically shown in FIG. 12A, rather than the space portion 13 for holding the end portion of the optical waveguide 10 and in the groove-like shape surrounded by the left-hand and right-hand side wall portions 12 and the bottom wall portion 11 as in the aforementioned examples.

In such a housing 14', the inside surface of a top wall portion 43 is formed as a tapered surface 44 approaching the bottom wall portion 11 side toward a front end surface 14b', as shown in FIG. 12A, for example. This inhibits the end portion of the optical waveguide 10 from further moving toward the front end surface 14b' side of the housing 14' as in the example shown in FIG. 11 to achieve the positioning of the front end surface 10a of the end portion of the optical waveguide 10 at a location inward from the front end surface 14b' of the housing 14'. In this case, the stoppers 40 or 41 shown in FIGS. 9A and 9B or FIGS. 10A and 10B may be, of course, provided at the same time near an opening edge of the front end surface 14b' of the housing 14'.

Also, the inside surfaces of not only the top wall portion 43 but also the bottom wall portion 11 side of the housing 14' may be formed as tapered surfaces so that the space portion 13' gradually becomes narrower downwardly and upwardly. Thus, the positioning of the optical waveguide 10 is achieved. Alternatively, as shown in FIG. 11, the left-hand and right-hand side wall portions 12 may be tapered, so that the space portion 13' gradually becomes narrower leftwardly and rightwardly. Also, the space portion 13' may gradually become narrower in four directions: upwardly, downwardly, leftwardly, and rightwardly.

Figure 12B:
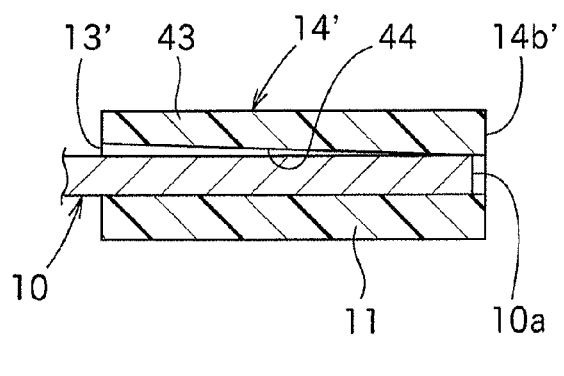
FIG. 12B is a vertical sectional view showing that an end portion of the optical connector kit is held by the aforementioned housing.
Figure 12C:
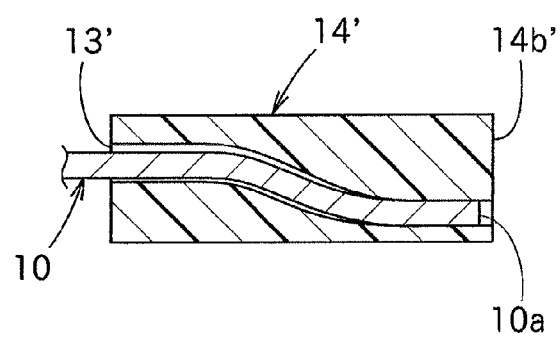
FIG. 12C is an illustration of a modification thereof.

In the tubular housing 14', the space portion 13' into which the end portion of the optical waveguide 10 is inserted need not necessarily be straight, but may be curved, as shown in FIG. 12C. In that case, it is necessary that the space portion 13' become narrower toward the front end side, so that the positioning of the front end surface 10a of the end portion of the optical waveguide 10 is achieved before the front end surface 14b' of the housing 14'.

The protruding and recessed portions and the tapered surfaces provided on and in the housing 14 (including 14'; the same applies to the subsequent reference character), the cover 15, and the optical waveguide 10 in the aforementioned examples for the purpose of achieving the positioning of the front end surface 10a of the end portion of the optical waveguide 10 at the front end surface 14b (including 14b'; the same applies to the subsequent reference character) of the housing 14 need not necessarily be bilaterally symmetric with respect to the optical waveguide 10, but may be provided only on one side. However, the protruding and recessed portions and the tapered surfaces which are bilaterally symmetric are preferable because the positioning of the optical waveguide 10 is achieved in a further stable form.

In embodiments employing the tubular housing 14' as shown in FIGS. 12A, 12B, and 12C, no adhesive agent is used to fix the optical waveguide 10 to the housing 14'. However, a boot portion may be fitted in the space portion 13' from the viewpoint of preventing the optical waveguide 10 from falling off. Also, an adhesive agent may be used when the boot portion is fitted in the space portion 13'.

In the present disclosure, the distance d that the front end surface 10a of the end portion of the optical waveguide 10 is spaced inward from the front end surface 14b at the time of the positioning of the front end surface 10a at a location inward from the front end surface 14b of the housing 14 is preferably in the range of 5 to 50 μm, and more preferably in the range of 5 to 20 μm. If the distance d is too long, the distance from a target for optical coupling is increased, and optical connection losses are accordingly increased. Thus, there is apprehension that the rate of the increase in optical connection losses is non-negligible, which is not preferable. On the other hand, if the distance d is too short, there is apprehension that the front end surface 10a of the end portion of the optical waveguide 10 is damaged unpreferably in the cases where the optical fiber protrudes from the front end surface of a target optical connector for connection thereto and where the front end surface itself of the target optical connector for connection thereto is uneven.

Of the connector members for an optical connector in the present disclosure, the connector member as shown in FIGS. 9A, 9B, 10A, 10B, 11, 12A, 12B, and 12C, for example, is capable of positioning the optical waveguide 10 with the use of only the positioner provided in the housing 14 of the connector member. Thus, this connector member need to be combined with a specific optical waveguide but may be handled as an independent connector member product.

On the other hand, it is desirable that the product capable of positioning the optical waveguide 10 by fitting the protruding portions 17 or the like provided on the housing 14 side of the connector member and the notches 19 or the like provided on the optical waveguide 10 side together as shown in FIGS. 1, 2A, 2B, 3, 4A, 4B, 5, 6A, 6B, 7A, 7B, 8A, and 8B, for example, is handled as an optical connector kit obtained by combining the connector member provided with these positioners and the optical waveguide 10 together.

EXAMPLES

Next, inventive examples of the present disclosure will be described in conjunction with comparative examples. It should be noted that the present disclosure is not limited to the inventive examples. In material compositions to be described below, "parts" refer to parts on a weight basis (i.e., "parts by weight").

First, materials to be described below were prepared as materials for the formation of an optical waveguide.

[Material for Formation of Under Cladding Layer and Over Cladding Layer]

Component a: 60 parts of an epoxy resin (jER1001 available from Mitsubishi Chemical Corporation).

Component b: 30 parts of an epoxy resin (EHPE3150 available from Daicel Corporation).

Component c: 10 parts of an epoxy resin (EXA-4816 available from DIC Corporation).

Component d: 0.5 parts of a photo-acid generator (CPI-101A available from San-Apro Ltd.).

Component e: 0.5 parts of an antioxidant (Songnox1010 available from Kyodo Chemical Co., Ltd.).

Component f: 0.5 parts of an antioxidant (HCA available from Sanko Co., Ltd.).

Component g: 50 parts of ethyl lactate (a solvent).

A material for the formation of an under cladding layer and an over cladding layer was prepared by mixing these components a to g together.

[Material for Formation of Cores for Optical Path and Dummy Cores]

Component h: 50 parts of an epoxy resin (YDCN-700-3 available from Nippon Steel & Sumikin Chemical Co., Ltd.).

Component i: 30 parts of an epoxy resin (jER1002 available from Mitsubishi Chemical Corporation).

Component j: 20 parts of an epoxy resin (OGSOL PG-100 available from Osaka Gas Chemicals Co., Ltd.).

Component k: 0.5 parts of a photo-acid generator (CPI-101A available from San-Apro Ltd.).

Component l: 0.5 parts of an antioxidant (Songnox1010 available from Kyodo Chemical Co., Ltd.).

Component m: 0.125 parts of an antioxidant (HCA available from Sanko Co., Ltd.).

Component n: 50 parts of ethyl lactate (a solvent).

A material for the formation of cores and dummy cores was prepared by mixing these components h to n together.

Inventive Examples 1 and 2

<Preparation of Connector Member>

First, polyphenylene sulfide (PPS) resin was injection-molded in a predetermined metal mold, whereby the housing 14 with the protruding portions 17 shown in FIG. 1, the cover 15 with the notches 18 shown in FIG. 1, and a boot portion were produced. The shape of the protruding portions 17 as seen in plan view is a semicircular shape with a radius of 0.25 mm. The space portion 13 for placing an end portion of the optical waveguide 10 thereon in the housing 14 had a width of 3.1 mm and a height of 1.3 mm. The cover 15 was shaped to enter the space portion 13 as seen in plan view, and had a thickness of 1.2 mm.

<Preparation of Optical Waveguide>

Figure 13:
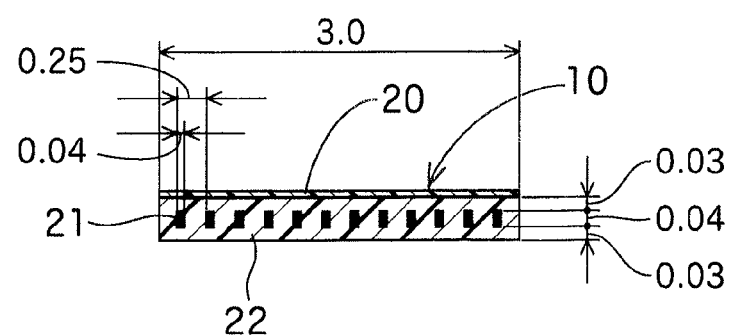
FIG. 13 is an illustration showing an exemplary optical waveguide for use in an inventive example of the present disclosure.

A polyimide film having a thickness of 15 µm was prepared as the insulation layer 20. The under cladding layer, the cores, and the over cladding layer were formed using the aforementioned materials in a stacked manner on one surface of the insulation layer 20 by patterning by means of predetermined mask exposure. Thus, the optical waveguide 10 having dimensions (in mm) shown in FIG. 13 was produced (a total length of 5 cm). A 45-degree mirror was formed on one surface of the optical waveguide 10. In FIG. 13, the reference numeral 21 designates the cores, and 22 designates a cladding layer configured such that the under cladding layer and the over cladding layer are integrated together. It should be noted that the configuration is shown schematically in FIG. 13 and is not drawn to scale (the same applies to the subsequent figures). This optical waveguide 10 includes the notches 19 for fitting on the protruding portions 17 provided on the housing 14 (with reference to FIGS. 2A and 2B) of a connector member. The position of the notches 19 was determined with respect to the front end surface 10a of the end portion of the optical waveguide 10 so that the distance d that the front end surface 10a of the end portion of the optical waveguide 10 was spaced inward from the front end surface 14b of the housing 14 was 5 µm in Inventive Example 1 and 50 µm in Inventive Example 2 when the notches 19 were fitted on the protruding portions 17 of the housing 14.

<Assembly of Optical Connector>

The optical waveguide 10 was set in the space portion 13 of the housing 14, with the protruding portions 17 on the housing 14 side and the notches 19 on the optical waveguide 10 side fitted together. An adhesive agent was applied onto the resultant structure on the base end surface 14a side. Then, the cover 15 was put on the resultant structure and pressed. Thereafter, the adhesive agent was cured, so that all of the components were integrated together. Thus, the optical connector was produced.

Inventive Example 3

<Preparation of Connector Member>

First, PPS resin was injection-molded in a predetermined metal mold, whereby the housing 14 having the two types of protruding portions 27a and 27b shown in FIGS. 7A and 7B, the cover 15 entering the space portion 13 of the housing 14 and having a thickness of 1.2 mm shown in FIGS. 7A and 7B, and a boot portion were produced. The space portion 13 in the housing 14 had a width of 3.1 mm and a height of 1.4 mm. The protruding portions 27a and 27b had dimensions shown in FIGS. 14A and 14B (in mm; the same applies to the subsequent figures).

<Preparation of Optical Waveguide>

A polyimide film having a thickness of 15 µm was prepared as the insulation layer 20. The under cladding layer, the cores, and the over cladding layer were formed using the aforementioned materials in a stacked manner on one surface of the insulation layer 20 by patterning by means of predetermined mask exposure. Thus, the optical waveguide 10 having dimensions shown in FIGS. 14C and 14D was produced (a total length of 5 cm). A 45-degree mirror was formed on one surface of the optical waveguide 10. In the figures, the reference numeral 21 designates the cores (for an optical path), 22 designates a cladding layer configured such that the under cladding layer and the over cladding layer are integrated together, and 30 designates dummy cores for fitting on the protruding portions 27a and 27b on the housing 14 side. FIG. 14D is a bottom view showing an arrangement of the cores 21 and the dummy cores 30. The position of the dummy cores 30 of the optical waveguide 10 was determined with respect to the front end surface 10a of the end portion of the optical waveguide 10 so that the distance d that the front end surface 10a of the end portion of the optical waveguide 10 was spaced inward from the front end surface 14b of the housing 14 was 25 µm when the dummy cores 30 were fitted on the protruding portions 27a and 27b of the housing 14.

<Assembly of Optical Connector>

An adhesive agent was applied to front and back surfaces of a portion of the end portion of the optical waveguide 10 which was disposed on the base end surface 14a side of the housing 14. The protruding portions 27a and 27b on the housing 14 side and the dummy cores 30 on the optical waveguide 10 side, which were fitted together, were set in the space portion 13 of the housing 14. Then, the cover 15 was put on the resultant structure and pressed. Thereafter, the adhesive agent was cured, so that all of the components were integrated together. Thus, the optical connector was produced.

Inventive Examples 4 and 5

<Preparation of Connector Member>

Figure 15A:
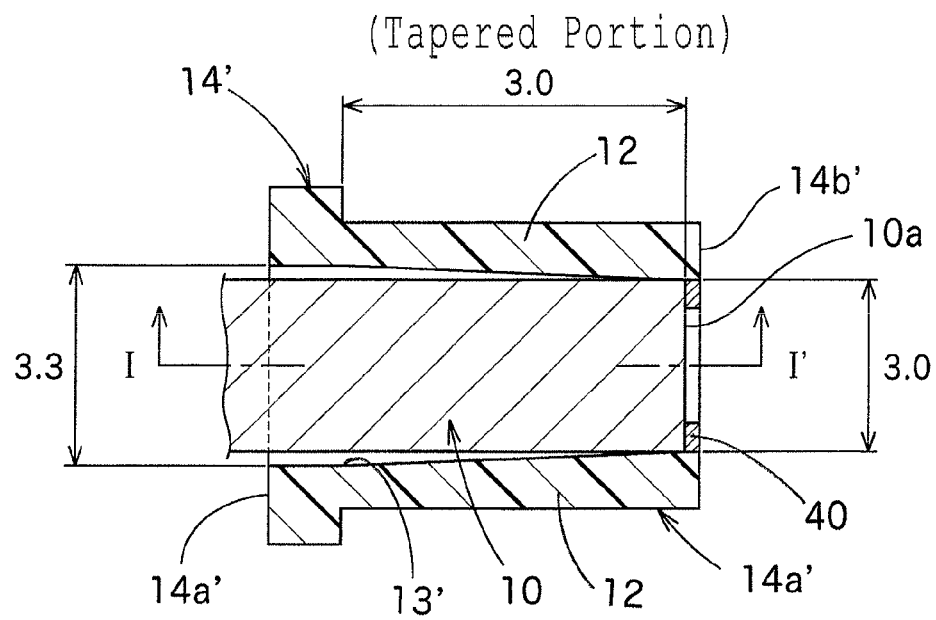
FIG. 15A is an illustration of the housing in the connector member for an optical waveguide for use in still another inventive example of the present disclosure.
Figure 15B:
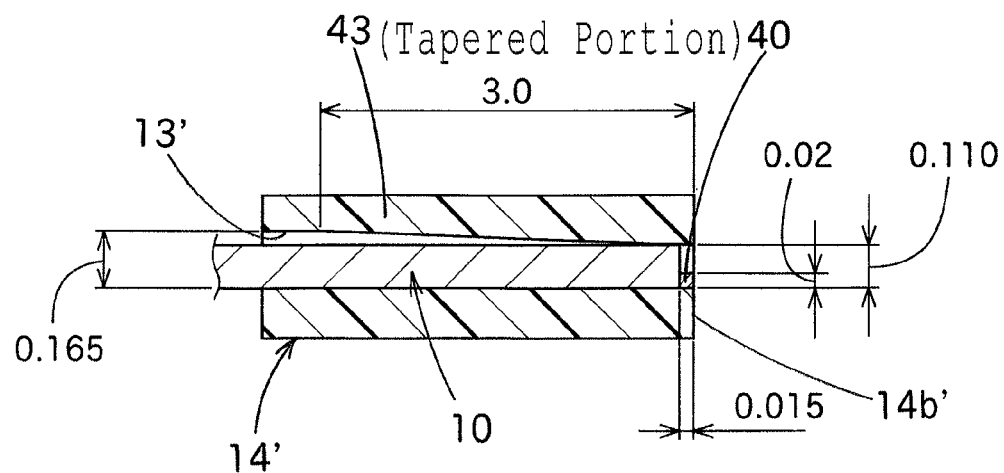
FIG. 15B is a sectional view taken along the line I-I' of FIG. 15A.
Figure 16:
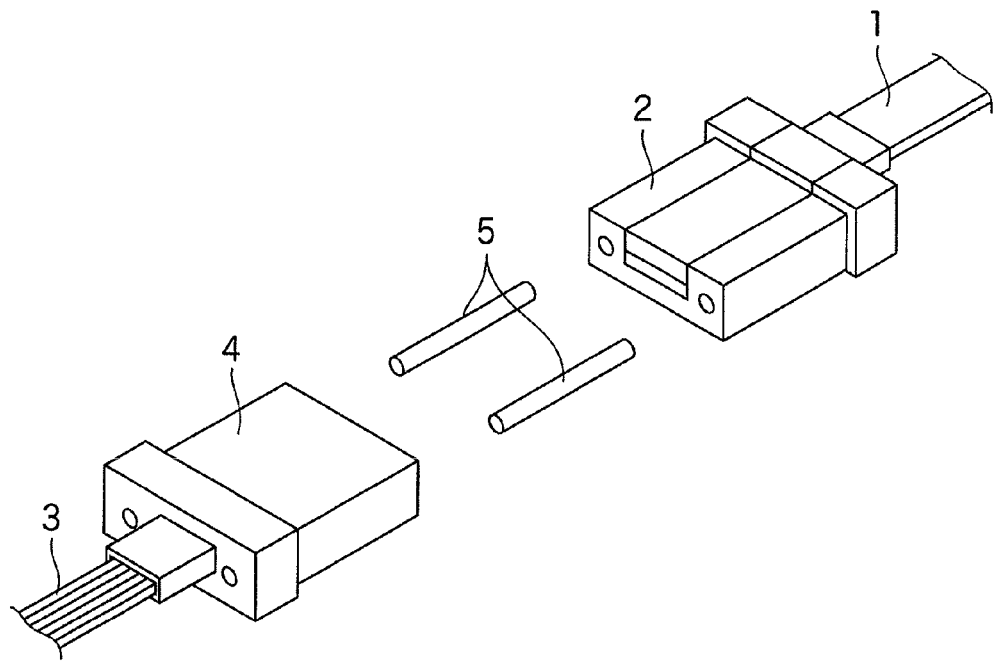
FIG. 16 is an illustration of a connection structure by means of typical optical connectors.
Figure 17:
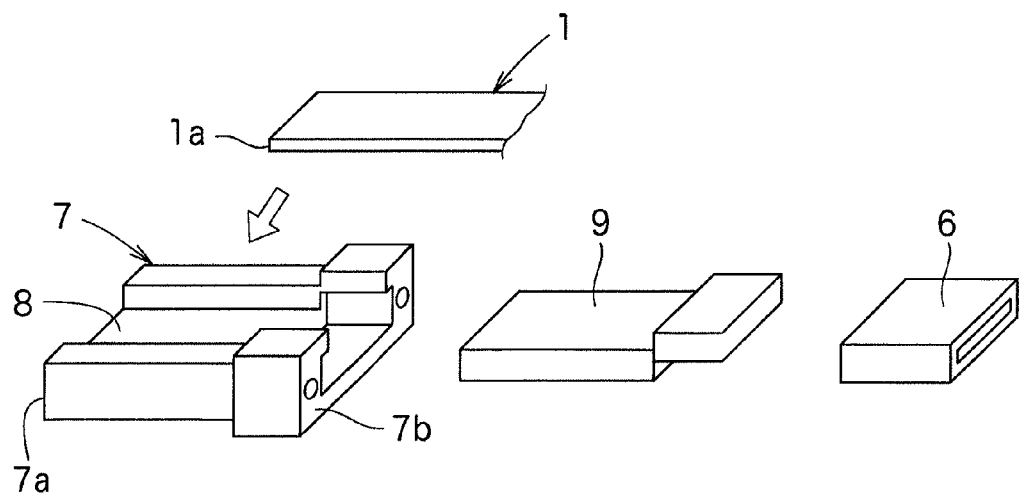
FIG. 17 is an illustration of an exemplary conventional optical connector.

First, PPS resin was injection-molded in a predetermined metal mold, whereby the tubular housing 14' shown in FIG. 15A in horizontal section and shown in FIG. 15B in section taken along the line I-I' of FIG. 15A and a boot portion were produced. The housing 14' in which the stoppers 40 shaded with fine diagonal lines in the figures were not provided was obtained as the housing 14' for Inventive Example 4. The housing 14' in which the aforementioned stoppers 40 were provided was obtained as the housing 14' for Inventive Example 5. In these housings 14', the left-hand and right-hand side wall portions 12 and the top wall portion 43 have tapered surfaces having dimensions shown in the figures, so that the space portion 13' becomes narrower toward the front end surface 14b'.

<Preparation of Optical Waveguide>

The optical waveguide 10 similar to that of Inventive Example 1 and having the shape of a strip having no notches 19 for fitting was prepared. This optical waveguide 10 was designed to be positioned at a location a distance of 15 µm inward from the front end surface 14b' of the housing 14' (d=15 µm) when inserted into the space portion 13' of the housing 14' of Inventive Examples 4 and 5 from a base end surface 14a' side.

<Assembly of Optical Connector>

The end portion of the optical waveguide 10 was inserted from the base end surface 14a' side of the housing 14', and was set when stopped on the front end surface 14b' side.

Comparative Example 1

A commercially available PMT connector member (a PMT ferrule available from Hakusan, Inc.) was used, and the same optical waveguide 10 as in Inventive Examples 4 and 5 was attached to the PMT connector member, whereby an optical connector was made. An alignment mark was previously placed so that the end portion of the optical waveguide 10 was disposed 70 μm inward from the front end surface of the connector member when set in the connector member. The end portion of the optical waveguide 10 was set while a user observed the alignment mark with an optical microscope (available from Keyence Corporation).

Comparative Example 2

The same PMT connector member as in Comparative Example 1 was used, and the same optical waveguide 10 as in Inventive Examples 4 and 5 was attached to the PMT connector member. The end portion of the optical waveguide 10 was set in a conventional manner so as to be flush with the front end surface of the connector member. Thereafter, an end surface was polished.

Items listed in TABLE 1 below were evaluated for each of the products of Inventive Examples 1 to 5 and Comparative Examples 1 and 2, and the results were also listed in TABLE 1. Properties of the configurations of Inventive Examples and Comparative Examples were briefly summarized in TABLE 1. A method of evaluating each of the items is as follows.

[Optical Connection Loss]

Light from a graded index (GI) type 50-μm multimode fiber (FFP-GI20-0500 available from Miki Inc.) connected to an 850-nm VCSEL light source (OP-250LS-850-MM-50-SC available from Miki Inc.) was received by a graded index (GI) type 50-μm multimode fiber (the same as described above) connected to a photodetector. The received light had an intensity $I_0$.

While an MT connector (12MT-PF-M ferrule available from Hakusan, Inc.) with an optical fiber was connected to each of the optical connectors of Inventive Examples and Comparative Examples, light from the same graded index (GI) type 50-μm multimode fiber connected to the 850-nm VCSEL light source as described above was caused to enter the 45-degree mirror formed on the optical waveguide 10 of each of the optical connectors. Then, the photodetector measured the intensity I of light detected from the optical fiber on the MT connector side.

Then, [$-10\times \log(I/I_0)$] was calculated from these values, and the calculated value was defined as an optical connection loss.

[Optical Connection Loss (after 100 Repetitions)]

Further, the connection and disconnection of the MT connector with the optical fiber to and from each of the optical connectors of Inventive Examples 1 to 5 and Comparative Examples 1 and 2 were repeated 100 times. Then, the MT connector with the optical fiber was connected again, and the optical connection loss was measured by the aforementioned method.

[Accuracy of Distance d]

Measurements of the distance d (with reference to FIG. 2A) between the front end surface 10a of the end portion of the optical waveguide 10 and the front end surface 14b or the like of the housing 14 or the like were performed on ten samples for each of the products of Inventive Examples 1 to 5 and Comparative Example 1 with the use of a laser microscope (VK-X250 available fromKeyenceCorporation). Then, the value of [Δd/d(a)] was calculated where Δd was a difference between maximum and minimum values of the measurement values, and d(a) was an average value thereof, and was evaluated based on the following criteria:

∘∘ (very good): less than 5%

∘ (good): in the range of not less than 5% and less than 10% x (poor): not less than 10%

[Operation Efficiency]

Operating time required to obtain the optical connector by combining the connector member and the optical waveguide 10 together in each of Inventive Examples 1 to 5 and Comparative Examples 1 and 2 was measured for each operating step. Then, evaluations were made from total time T that is the sum of [time required for a positioning operation for the distance d] and [time required for an end surface polishing operation] excepting adhesive agent application time and adhesive agent curing time which were common to Examples, based on the following criteria:

∘ (good): less than 10 minutes x (poor): requiring not less than 10 minutes

The time T in Examples was as follows:

Inventive Examples 1 to 5 positioning time for distance d (1 min.)+end surface polishing time (0 min.)=a total of 1 min.

Comparative Example 1 positioning time for distance d (10 min.)+end surface polishing time (0 min.)=a total of 10 min.

Comparative Example 2 positioning time for distance d (0 min.)+end surface polishing time (30 min.)=a total of 30 min.

[Comprehensive Evaluation]

By combining the evaluations of the four evaluation items descried above together, Inventive Examples 1 to 5 and Comparative Examples 1 and 2 were evaluated in three grades: ∘∘ (very good), ∘ (good), and x (poor).

TABLE 1

| | | Inventive Examples | | | | | Comparative Examples | |
|---|---|---|---|---|---|---|---|---|
| | | 1 | 2 | 3 | 4 | 5 | 1 | 2 |
| Properties of configuration | Inward or not *1 | Inward | Inward | Inward | Inward | Inward | Inward | Flush |
| | Distance d *2 | 5 | 50 | 25 | 15 | 15 | 70 | — |
| | Positioner | Present | Present | Present | Present | Present | Absent | Absent |
| | Configuration of positioner | Fit between left and right side wall portions of housing and | Fit between left and right side wall portions of housing and | Fit between bottom wall portion of housing and front surface | Positioning using left and right side wall portions of housing | Positioning using left and right side wall portions of housing and | — | — |

TABLE 1-continued

|  |  | Inventive Examples | | | | | Comparative Examples | |
|---|---|---|---|---|---|---|---|---|
|  |  | 1 | 2 | 3 | 4 | 5 | 1 | 2 |
|  |  | left and right side surface portions of optical waveguide | left and right side surface portions of optical waveguide | of optical waveguide | and taper of top wall | taper of top wall + Positioning using stoppers inside front end surface |  |  |
|  | End surface polishing operation | Unnecessary | Unnecessary | Unnecessary | Unnecessary | Unnecessary | Unnecessary | Necessary |
| Evaluation | Optical connection loss (1st time) | 3.1 | 3.5 | 3.1 | 3.2 | 3.1 | 3.7 | 3.1 |
|  | Optical connection loss (after 100 repetitions) | 3.1 | 3.5 | 3.1 | 3.2 | 3.1 | 3.7 | 4.8 |
|  | Accuracy of distance d | ○ | ○ | ○ | ○ | ○○ | ○ | — |
|  | Operation efficiency | ○ | ○ | ○ | ○ | ○ | X | X |
|  | Comprehensive evaluation | ○ | ○ | ○ | ○ | ○○ | X | X |

*1 Inward or not: Whether the front end surface of the end portion of the optical waveguide is disposed inward from the front end surface of the housing or not.
*2 Distance d: Distance d (μm) that the front end surface of the end portion of the optical waveguide is spaced inward.

The aforementioned results show that each of the products of Inventive Examples is good in operation efficiency during the assembly of the optical connector and is low in optical connection loss for the first time and after the connection is repeated 100 times to have excellent quality. On the other hand, the product of Comparative example 1, in which the positioning of the optical waveguide 10 is effected by making visual observations, is poor in operation efficiency and makes the positioning near the front end surface of the housing 14 or the like difficult, so that the distance d is forced to be long. Also, the product of Comparative example 2, which necessitates the end surface polishing operation, is poor in operation efficiency. In addition, it is found that the product of Comparative example 2 has a short life because the repetitions of the connection significantly increase the optical connection loss.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The present disclosure is widely usable as a connector member capable of forming a high-quality optical connector obtained easily at low costs and prevented from increasing an optical connection loss after the repeated connections, as an optical connector kit, or as an optical interconnection using the same.

REFERENCE SIGNS LIST

10 Optical waveguide
10a Front end surface of end portion
12 Side wall portions
13 Space portion
14 Housing
14a Base end surface
14b Front end surface
17 Protruding portions

The invention claimed is:

1. A connector member for an optical waveguide, comprising a housing which comprises:
   a base end surface provided with an opening for insertion of an optical waveguide;
   a front end surface provided with an opening for optical coupling between the optical waveguide and another light guide;
   a space portion extending from the opening of the base end surface to the opening of the front end surface; and
   a wall portion surrounding the space portion,
   wherein the space portion is configured to hold an end portion of the optical waveguide,
   wherein the wall portion is provided with a positioner configured to position a front end surface of the end portion of the optical waveguide held in the space portion at a location a distance inward from the front end surface of the housing, and
   wherein the positioner is at least one selected from the group consisting of a protruding portion, a recessed portion, and a tapered surface.

2. The connector member for an optical waveguide according to claim 1, wherein the distance that the front end surface of the end portion of the optical waveguide held in the space portion of the housing is spaced inward from the front end surface of the housing is in the range of 5 to 50 μm.

3. The connector member for an optical waveguide according to claim 1, wherein a protruding portion protruding inward into the space portion is provided as the positioner on the wall portion of the housing.

4. The connector member for an optical waveguide according to claim 1, wherein a tapered surface making the space portion narrower toward the front end surface is provided as the positioner in a predetermined region of the wall portion of the housing which extends in a direction from the base end surface toward the front end surface.

5. An optical connector kit comprising:
   an optical waveguide; and
   a connector member for an optical waveguide,
   wherein the connector member for an optical waveguide includes a housing which comprises:

a base end surface provided with an opening for insertion of the optical waveguide;

a front end surface provided with an opening for optical coupling between the optical waveguide and another light guide;

a space portion extending from the opening of the base end surface to the opening of the front end surface; and a wall portion surrounding the space portion, and the space portion configured to hold an end portion of the optical waveguide, wherein at least one of the wall portion of the housing and the end portion of the optical waveguide held in the space portion is provided with a positioner configured to position a front end surface of the end portion of the optical waveguide held in the space portion at a location a distance inward from the front end surface of the housing, and wherein the positioner is at least one selected from the group consisting of a protruding portion, a recessed portion, and a tapered surface.

6. The optical connector kit according to claim 5, wherein the distance that the front end surface of the end portion of the optical waveguide held in the space portion of the housing is spaced inward from the front end surface of the housing is in the range of 5 to 50 μm.

7. The optical connector kit according to claim 5, wherein protruding or recessed shapes to be fitted together as the positioner are imparted respectively to the wall portion of the housing and to the end portion of the optical waveguide held in the space portion.

8. An optical interconnection comprising:

an optical waveguide; and a connector member for an optical waveguide, wherein the connector member for an optical waveguide includes a housing which comprises:

a base end surface provided with an opening for insertion of the optical waveguide;

a front end surface provided with an opening for optical coupling between the optical waveguide and another light guide;

a space portion extending from the opening of the base end surface to the opening of the front end surface; and a wall portion surrounding the space portion;

wherein an end portion of the optical waveguide is held in the space portion, wherein a positioner provided in at least one of the wall portion of the housing and the end portion of the optical waveguide positions a front end surface of the end portion of the optical waveguide held in the space portion at a location a distance inward from the front end surface of the housing, and wherein the positioner is at least one selected from the group consisting of a protruding portion, a recessed portion, and a tapered surface.

9. The optical interconnection according to claim 8, wherein the distance that the front end surface of the end portion of the optical waveguide held in the space portion of the housing is spaced inward from the front end surface of the housing is in the range of 5 to 50 μm.

10. The optical interconnection according to claim 8, wherein protruding or recessed shapes to be fitted together as the positioner are imparted respectively to the wall portion of the housing and to the end portion of the optical waveguide held in the space portion.

\* \* \* \* \*